United States Patent
Ponsart et al.

(10) Patent No.: US 7,861,971 B2
(45) Date of Patent: Jan. 4, 2011

(54) SYSTEM FOR OPENING AND CLOSING A LANDING-GEAR COMPARTMENT FOR AN AIRCRAFT

(75) Inventors: Jaouen Ponsart, Toulouse (FR); Yannick Vandomel, Toulouse (FR)

(73) Assignee: Airbus France, Toulouse (FR)

( * ) Notice: Subject to any disclaimer, the term of this patent is extended or adjusted under 35 U.S.C. 154(b) by 101 days.

(21) Appl. No.: 11/972,244

(22) Filed: Jan. 10, 2008

(65) Prior Publication Data

US 2008/0173760 A1 Jul. 24, 2008

(30) Foreign Application Priority Data

Jan. 11, 2007 (FR) .................................. 07 52634

(51) Int. Cl.
*B64C 1/14* (2006.01)
(52) U.S. Cl. ................. 244/129.5; 244/102 R
(58) Field of Classification Search ............. 244/129.5, 244/129.4, 129.1, 101, 50, 100 R, 102 R, 244/102 A, 102 SL, 102 SS, 130; 49/169, 49/209, 216, 254
See application file for complete search history.

(56) References Cited

U.S. PATENT DOCUMENTS

| 2,548,832 | A | * | 4/1951 | Tydon | ......................... 244/101 |
| 2,747,817 | A | * | 5/1956 | Saulnier | ....................... 244/50 |
| 2,814,454 | A | * | 11/1957 | Atkins et al. | ............. 244/102 R |
| 3,485,465 | A | * | 12/1969 | Churchill | ................. 244/102 R |
| 7,357,354 | B2 | * | 4/2008 | Mortland | .................. 244/129.5 |

FOREIGN PATENT DOCUMENTS

| EP | 267876 A2 * | 5/1988 |
| EP | 1615819 B1 | 11/2006 |
| WO | 03/089297 A1 | 10/2003 |

* cited by examiner

*Primary Examiner*—Joshua J Michener
(74) *Attorney, Agent, or Firm*—Perman & Green LLP

(57) ABSTRACT

A system for opening and closing an aircraft landing-gear compartment is described. The landing-gear compartment includes a plurality of hatches mounted on a fairing of the aircraft and has main hatches with crosswise openings and at least one secondary hatch with a longitudinal opening.

11 Claims, 6 Drawing Sheets

SYSTEM FOR OPENING AND CLOSING A LANDING-GEAR COMPARTMENT FOR AN AIRCRAFT

BACKGROUND

1. Field

The disclosed embodiments relate to a system for opening and closing a landing-gear compartment of an aircraft.

The disclosed embodiments find application in aeronautics and especially in the field of hatches for closing aircraft landing-gear compartments.

2. Description of the Prior Art

A landing-gear compartment is a housing designed to receive a landing gear of an aircraft. In most aircraft used to carry goods or people, the gear compartment is situated in the fuselage of the aircraft. The gear compartment is generally closed by an opening and closing system comprising several hatches. These hatches can be of several kinds. Conventionally, an opening and closing system or hatch system comprises at least two main hatches, for example front gear hatches which open to enable the landing gear to be lowered and which close when the gear is extended. It can also comprise at least two secondary hatches, for example rear gear hatches which open to enable the lowering of the gear and remain open so long as the gear is extended. It may also comprise a first hatch, called a central hatch or main leg fairing which, like the secondary hatches, remains open so long as the gear is extended.

A landing-gear hatch, more simply called a gear hatch, usually has a panel fixed to hinge arms. Generally, these hinge arms are goose-necked features hinged on the structure of the aircraft, about a pivoting shaft offset towards the interior of the landing gear relative to the panel. The goose-necked features are generally distributed along the length of the hatch and are fixed on the one hand to the hatch and on the other hand to the structure of the aircraft. At least one goose-necked feature is connected, by means of a link-rod, to the structure of the aircraft. This link-rod enables a motion of rotation of the hatch relative to the fairing of the aircraft. Thus, when the landing gear is extended, the pivoting of the hatch out of the fuselage is obtained by means of the link-rod and the goose-necked hinges.

At present, each secondary hatch is connected to the landing gear by a direct link. This direct link consists of a link-rod fixed on the one hand to the landing gear, for example on the gear leg and, on the other hand, to the hatch. This link-rod enables the hatch to be maneuvered directly according to the motions of the landing gear. Thus, when the landing gear is retracted, the very fact that the landing gear rises into the landing-gear compartment causes the hatch to close. At the same time, when the landing gear is extended, this direct link enables the hatch to be opened by pushing said hatch out of the fuselage. More specifically, when the gear is extended, it rotates about an axis giving rise to a translation motion of the link-rod which pushes the hatch to its open position. A direct link of this kind therefore enables the extension of the landing gear and the opening of the hatch to be controlled at the same time.

To preserve the aerodynamic qualities of the aircraft fuselage, the arrangement of the pivoting shaft of the landing gear is done within the gear compartment. The hatches close after having let through the landing gear in order to minimize aerodynamic disturbance. For aerodynamic reasons, the secondary hatches have a minimum surface area and aperture enabling the deployment of the landing gear. Indeed, since the secondary hatches remain open so long as the gear is out, it is important to achieve the maximum reduction in the number and surface area of the elements likely to create disturbance in the flow of fluids along the fuselage of the aircraft.

At present, in most aircraft, the gear compartment is closed by means of an opening and closing system comprising four or five hatches. In the case of a four-hatch system, there are generally two rear hatches or secondary hatches and two front hatches or main hatches placed side by side.

In the case of a five-hatch system, there are generally two front hatches, two rear hatches and one central hatch or main leg fairing. An example of a five-hatch system is shown in FIG. 1. The two front hatches 1 and 2, namely the main hatches are large-sized hatches enabling the passage of the entire landing gear. These front hatches open on either side of the fuselage of the aircraft, perpendicular to the fuselage, so that only the thickness of the hatches forms an obstacle to the path of flow of the fluids. In other words, the front hatches open transversally, respectively to the right and to the left of the fuselage of the aircraft.

In this five-hatch system, the two rear hatches 3 and 4, or secondary hatches, open like the front hatches, on either side of the fuselage of the aircraft, perpendicularly to the fuselage. The rear hatches therefore also have a transversal opening, respectively to the right and to the left of the aircraft fuselage. As shown in FIG. 2, when the rear hatches 3 and 4 are open, they are situated on either side of the leg of the landing gear 6, substantially in the same plane as the tires 7 of the landing gear. As explained here above, the rear hatches 3 and 4 are each actuated by means of a link-rod fixed on the one hand to the gear and, on the other hand, to the hatch. Thus, the extension of the landing gear has the effect of pushing the rear hatches out of the fuselage of the aircraft.

In this five-hatch system, the main leg fairing 5 is connected rigidly to the landing gear. As is shown in FIG. 3, the main leg fairing 5 is linked solely to the landing gear. It has no hinge with the fairing. Indeed, as can be seen in FIGS. 1 and 3, the main leg fairing 5 is situated between the front hatches, along the rear hatches. It is connected neither to the fuselage of the aircraft nor to the other hatches. It is connected only to the landing gear. Thus, when the landing gear gets extended, the main leg fairing 5 is lowered along the gear leg 6, as can be seen in FIG. 2, and remains along the gear leg so long as the landing gear is extended.

In certain aircraft, especially cargo aircraft designed solely for freight operations, there may exist certain constraints as regards the positioning of the floor. For, in certain cases, goods transporters need to be able to load their goods by means of wheeled trolleys inside the aircraft. To this end, the aircraft floor needs to be plane, i.e. it must form a zero or near-zero angle with the horizontal. Now, certain aircraft have a non-plane floor forming an angle of 1 to 2 degrees with the horizontal. To reduce this angle without however modifying the entire aircraft, the floor can be lifted so that it has a near-zero angle relative to the horizontal. A simpler technique to raise the floor consists in raising the nose of the aircraft when it is on the ground, for example by increasing the height of the landing gear.

To modify this height of the landing gear, it is possible to modify the design of the gear itself. Now, this would entail considerable cost, both for the designing of the gear and for the replacement of the landing gear on the aircraft, depending on the goods or passengers to be carried.

To modify the height of the landing gear without modifying the design of the gear, it is possible to modify the point of rotation of the landing gear so that it is situated at a lower position within the aircraft. This has the effect of raising the nose of the aircraft, thus straightening the slope of the floor.

To this end, it is chosen to lower the axis of rotation of the landing gear. Now, this technique has the direct consequence of shifting the axis of rotation of the landing gear out of the fuselage, i.e. beneath the classic fairing of the aircraft. The fairing of the aircraft then needs to be modified so as to make it incorporate the offset part of the gear. The new fairing is then domed. It forms a sort of protuberance relative to the fuselage of the aircraft. FIG. 4 is a schematic sectional view of an aircraft fuselage 8 equipped with a fairing of this kind. In this figure, the reference 81 represents an example of a fuselage. In the case of a classic fuselage, the hatch system would be situated at the position of the dashes 83. In the case of an aircraft whose gear height has been modified, the fuselage has a fairing that forms a protruding feature 82. This protruding feather 82 has direct consequences for the system of opening and closing the landing-gear compartment. Indeed, this gives rise to an increase in the surface area of the hatches which has the direct effect of increasing the mass of the hatches and hence the total mass of the aircraft and of modifying the clearances between the goose-necked features that connect the hatches and the fairing. This modification of the clearances between the goose-necked features causes problems relating to the play of the hatches, at the corners of the rotating link-rods used to open the rear hatches.

Furthermore, the pre-stress needed on the front hatches is kept. This pre-stress serves to optimize the flow along the aircraft and prevent the hatches from vibrating because of a pressure difference.

Besides, with a five-hatch system adapted to the modified fairing, the transmission forces on the rear hatches are excessive. This may give rise to vibrations in the hatches. To resolve this problem of transmission of forces, it would be necessary to oversize the link-rods, and the effect of this would be to make it difficult to open the hatches using these oversized link-rods. Furthermore, these oversized link-rods would have to provide for a clearance for the hatches at a maximum angle of 170° of the rotating link-rods and, at the least vibration, would risk exceeding their angular limit of 180°. After this angle has been crossed, there is a risk that these hatches would go in the wrong direction from the kinematic point of view and therefore cause deterioration in the system.

SUMMARY

The disclosed embodiments are aimed precisely at overcoming the drawbacks of the techniques explained here above. To this end, the disclosed embodiments propose a system for opening and closing a landing-gear compartment that can comprise a single secondary hatch opening longitudinally so as to be in the direction of flow of the fluids. Such an opening system prevents problems of play of the hatches and of transmission forces.

More specifically, the disclosed embodiments relate to a system for opening and closing a landing-gear compartment of an aircraft comprising a plurality of hatches mounted on a fairing of the aircraft, characterized in that the system comprises main hatches with transversal opening and at least one secondary hatch with longitudinal opening.

The disclosed embodiments can also comprise one or more of the following characteristics:

the secondary hatch comprises a closed position in which said hatch is placed in the continuity of the fairing of the aircraft and an open position in which said hatch is parallel to the fairing of the aircraft.

the secondary hatch is fixed to the fairing of the aircraft by means of a hinging system giving the secondary hatch a motion of vertical translation and a combined motion of rotation and horizontal translation.

the secondary hatch, during the opening process, is always parallel to the flow of the fluid.

the hinge system comprises a goose-necked hinge fixed by a first rotating link to the fairing and by a second rotating link to the secondary hatch.

the second rotating link comprises a plurality of ties distributed on the secondary hatch.

at least one of the ties provides for a rotation of the goose-necked feature and a gradual kinematic locking of the secondary hatch.

the hinge system comprises a linking element forming a stop for the closing of the front hatches.

the linking element is fixed to the landing gear by a rigid link and connected to the secondary hatch by a third rotating link.

the secondary hatch is equipped with a stiffening piece.

at least one tie is incorporated into the stiffener.

the opening and closing system comprises two main hatches and one secondary hatch.

The disclosed embodiments also relate to an aircraft comprising a system as described here above.

DETAILED DESCRIPTION OF EMBODIMENTS

The disclosed embodiments propose a system for opening and closing a landing-gear compartment comprising main hatches having a transversal aperture and a secondary hatch having a longitudinal aperture. In the embodiment of the disclosed embodiments that shall be described, the system has three hatches, namely two main hatches, hereinafter called front hatches, and a secondary hatch called a rear hatch.

Figure 2:
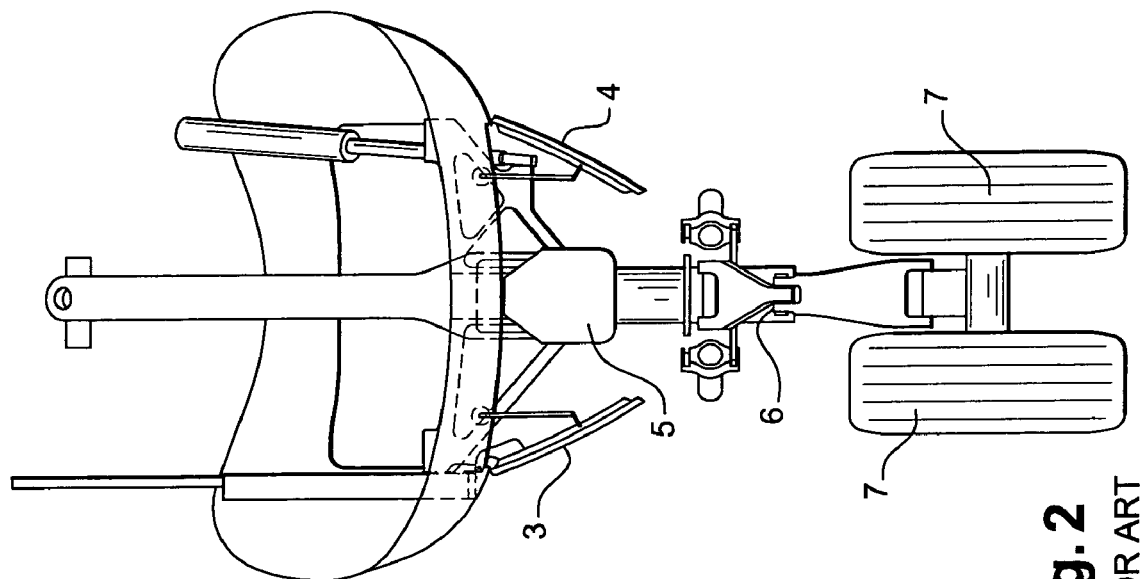
FIG. 2, already described, shows an extended or deployed landing gear leg, when the landing gear is closed by a five-hatch opening and closing system.
Figure 1:
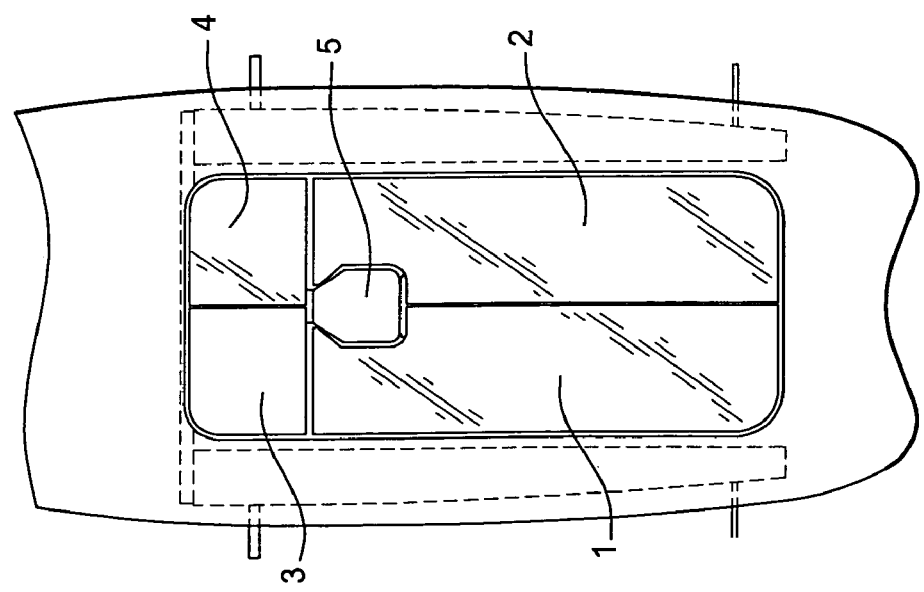
FIG. 1, already described, shows an example of a classic five-hatch system for opening and closing a landing-gear compartment.
Figure 3:
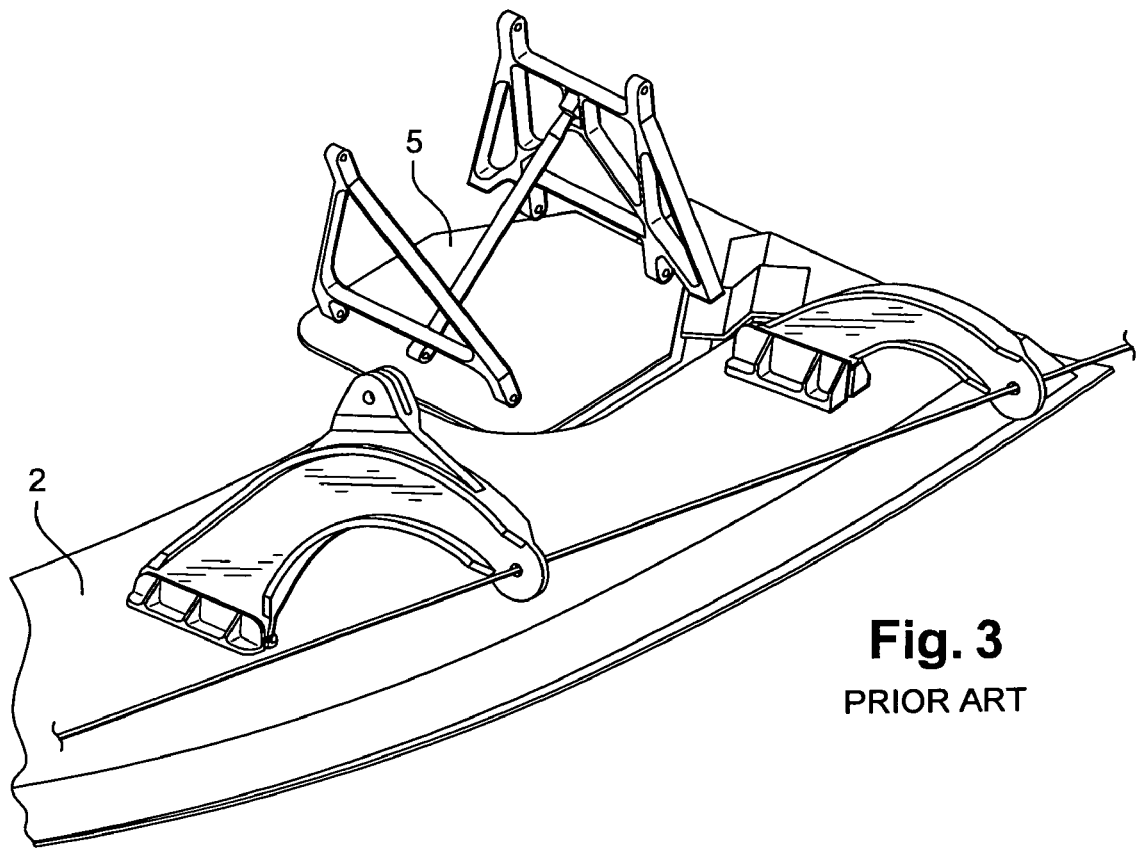
FIG. 3, already described, represents a main leg fairing in the case of a five-hatch opening and closing system.
Figure 4:
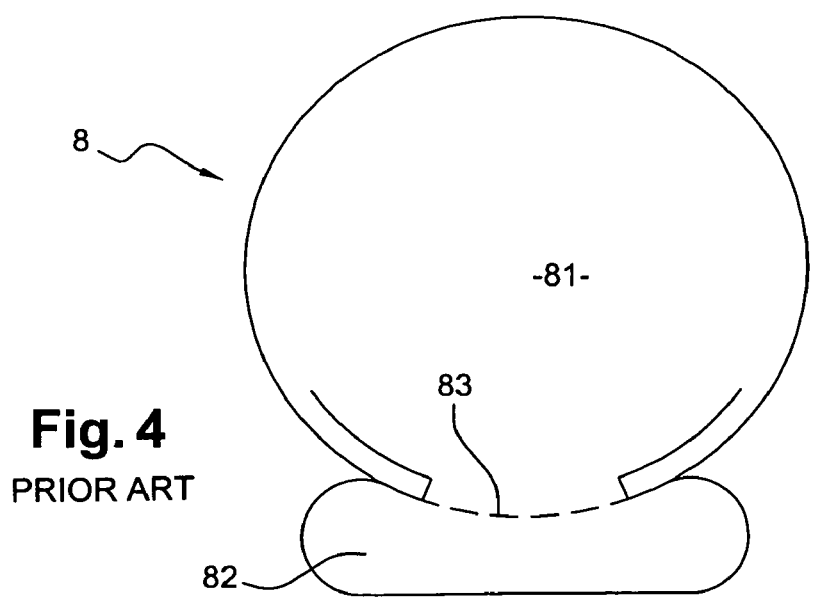
FIG. 4, already described, shows a schematic sectional view of an aircraft fuselage in the case of a domed fairing.
Figure 5A:
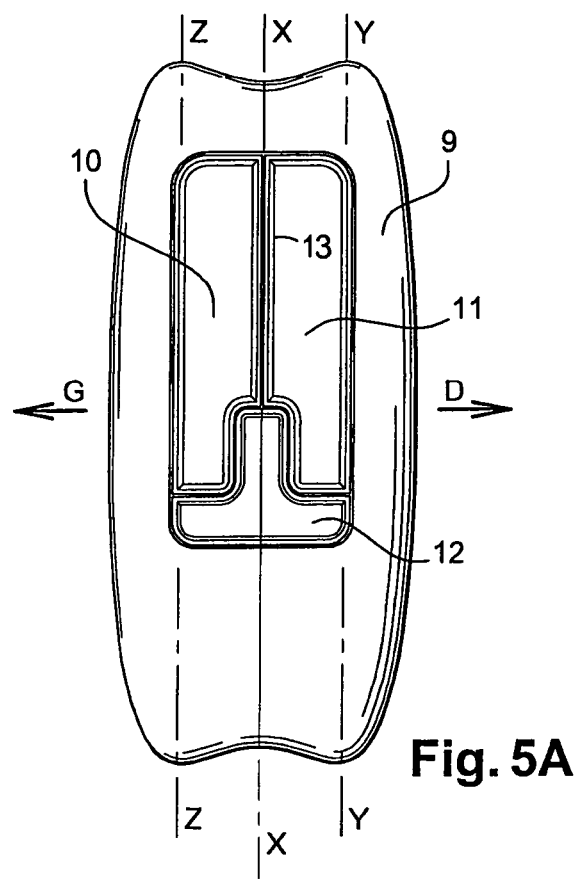
FIGS. 5A and 5B show a top view and a bottom view the system of the disclosed embodiments for opening and closing a gear compartment according to the disclosed embodiments.
Figure 5B:
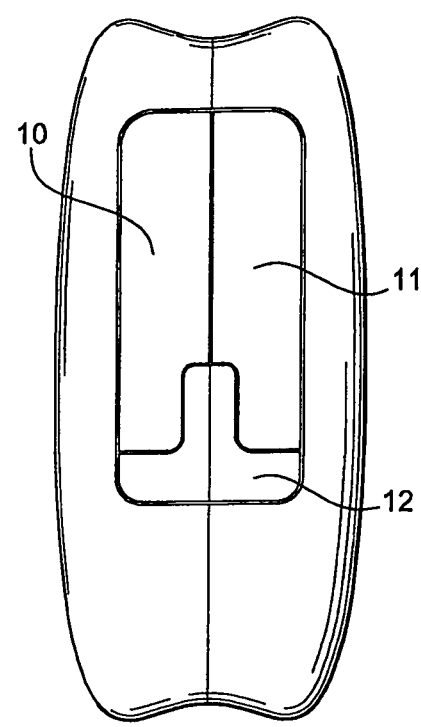

A three-hatch system according to the disclosed embodiments is shown in FIGS. 5A and 5B. These FIGS. 5A and 5B show a gear compartment opening and closing system, hereinafter called an opening system, adapted to a domed aircraft fairing 9. FIG. 5A shows a top view of the opening system, i.e. a view from inside the fuselage of the aircraft. FIG. 5B shows a bottom view of the opening system, i.e. a view from beneath the aircraft.

As can be seen in FIGS. 5A and 5B, the opening system of the disclosed embodiments has a shape substantially identical to that of the prior art five-hatch system. In other words, the system of the disclosed embodiments has external dimensions substantially similar to those of the five-hatch system described here above, adapted to a modified fairing, i.e. a domed fairing.

In the disclosed embodiments, the opening system has two main hatches or front hatches 10 and 11 and a secondary hatch or rear hatch 12. The front hatches have a shape close to that of the front hatches of the prior art five-hatch system. The rear hatch 12 has a shape close to that of the assembly constituted by the two rear hatches and the main leg fairing of the prior art. However, the sizes of the front and rear hatches of the system of the disclosed embodiments may differ from those of the prior art hatches. For example, the size of the front hatches may be 9.5% greater and that of the rear hatch 8.5% smaller than in the prior art five-hatch system.

The rear hatch 12 is substantially shaped like an inverted T. The front hatches 10 and 11 are symmetrical to each other relative to an axis XX passing through the joint 13 of said front hatches. The front hatches are substantially rectangular with a recess corresponding to half of the leg of the T feature of the rear hatch 12.

The front hatches 11 and 10 of the system of the disclosed embodiments open transversely, i.e. they open by rotation about a longitudinal axis, respectively the axis YY and the axis ZZ. In other words, the front hatch 10 pivots about an axis ZZ toward the left G of the fairing 9 and the front hatch 11 pivots about an axis YY toward the right D of the fairing 9. The front hatches thus have a transversal aperture relative to the fuselage.

The rear hatch 12 of the system of the disclosed embodiments opens longitudinally, i.e. it opens by translation relative to the fuselage of the aircraft. More specifically, the rear hatch 12 performs a double motion, namely:

a first vertical translation, toward the ground, to move away from the front hatches, and a second horizontal translation, parallel to the fairing, combined with a rotation, to free the opening of the gear compartment.

The rear hatch, once opened, is parallel to the fairing 9 and is thus in the direction of flow of the fluids. The shifting of the rear hatch by translation prevents problems where the fairing is caught when the hatch is opened. It also makes it possible to meet all the aerodynamic constraints.

Figure 6:
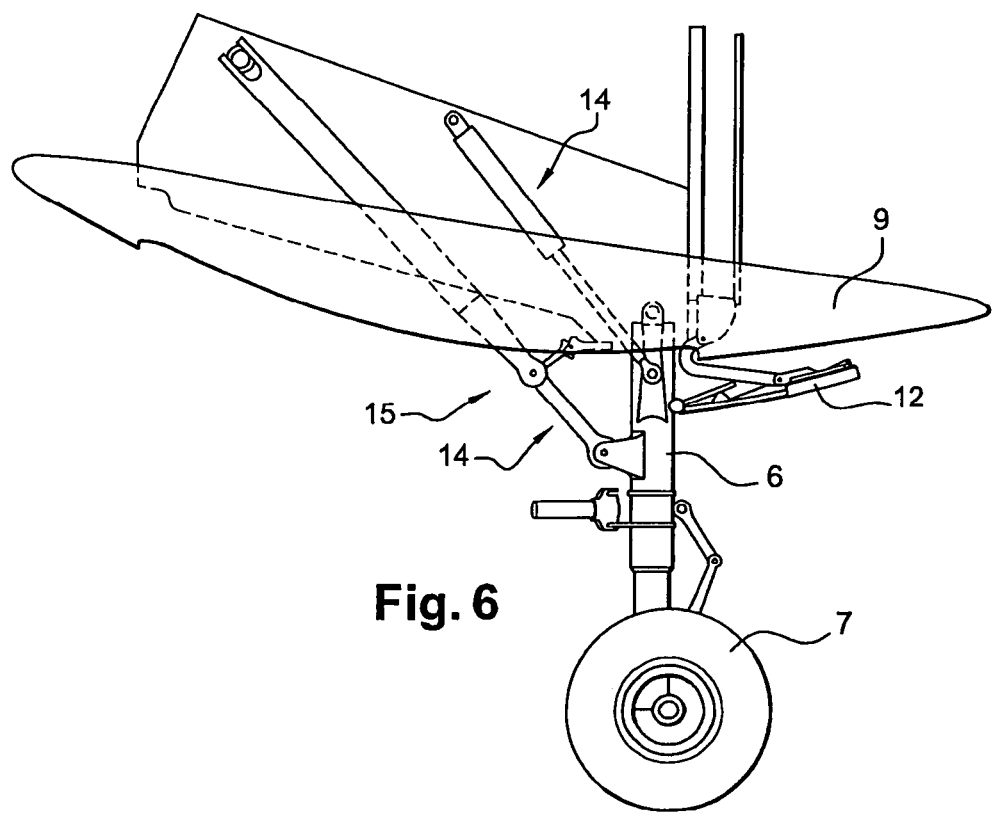
FIG. 6 shows a deployed or extended landing gear leg when the gear compartment is equipped with the system of the disclosed embodiments.

FIG. 6 shows a landing gear deployed in the case of an opening system according to the disclosed embodiments. This FIG. 6 shows the landing gear 6 when it is extended. In this case, the front hatches, which are not shown in FIG. 6, are closed and the rear hatch 12 is open. This example shows the landing gear 6 with its tie system 14. This tie system 14 is classic. It comprises especially, a stay rod 15 used to maintain the landing gear in its extended position. This tie system is identical to those of the prior art and shall not be described in detail. It must be noted however that the system of hatches according to the disclosed embodiments enables the passage of the stay rod, even when the hatches are closed.

This FIG. 6 shows the rear hatch 12 in a longitudinal opening position. The rear hatch is then placed along the fuselage, parallel to the fairing 9, so as to be in the sense of flow of the fluids. In other words, the secondary hatch remains always parallel to the flow of the fluid during the hatch opening process.

Figure 7A:
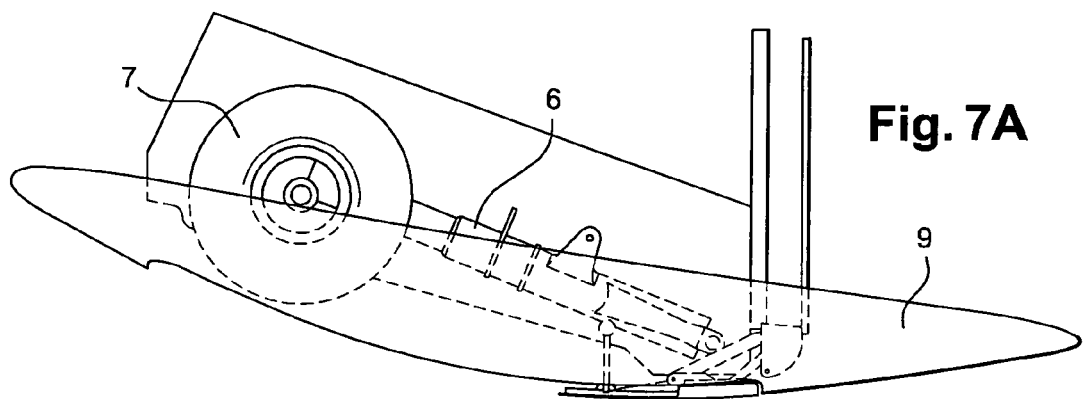
FIGS. 7A, 7B and 7C show different positions of the secondary hatch in the system of the disclosed embodiments.
Figure 7B:
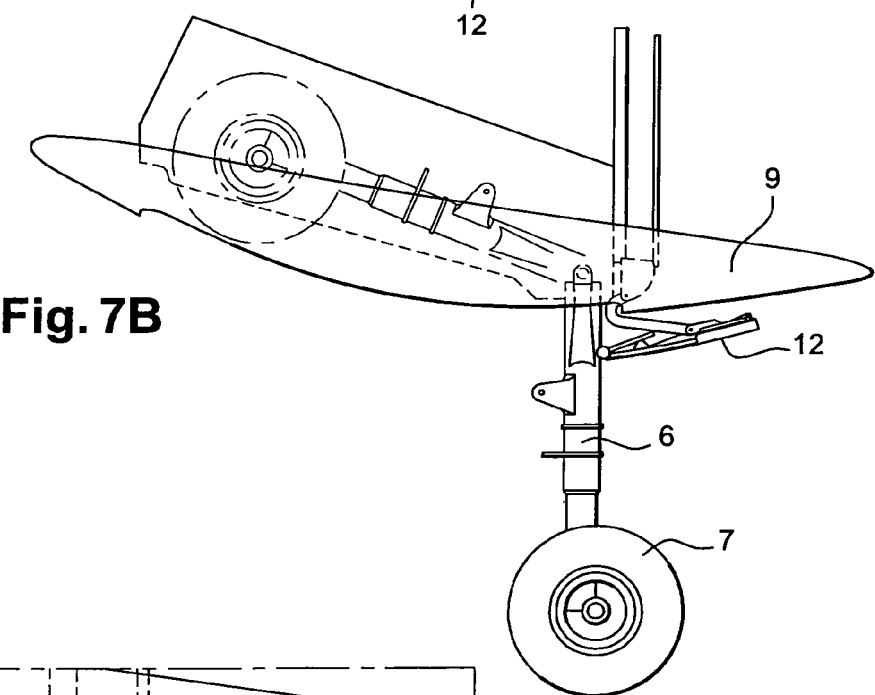
Figure 7C:
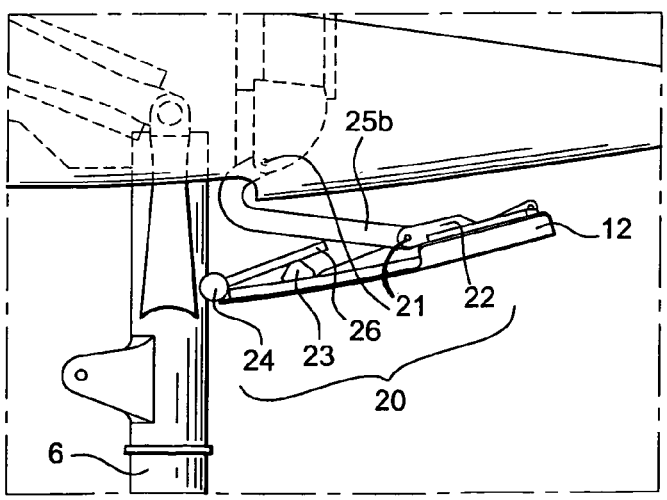

FIGS. 7A, 7B, 7C provide a schematic view of the kinematics of extension and retraction of the landing gear in the case of a system for opening a gear compartment according to the disclosed embodiments. In all these three figures, the front hatches and the gear tie system (with the stay rods) are not shown, in order to simplify the figures.

More specifically, FIG. 7A shows the landing gear retracted into the gear compartment, with the rear hatch 12 closing the gear compartment. The rear hatch is placed so as to be located in the continuity of the fuselage of the aircraft and in the continuity of the front hatches (which are not shown) to provide the aircraft with an aerodynamic profile. It can be understood, from seeing this figure, that when the front hatches are closed, they become part of the continuity of the fairing 9 beneath the landing gear 6 and the rear hatch 12.

FIG. 7B, shows the kinematics of deployment of the landing gear 6, simultaneously with the opening of the rear hatch 12. It can be seen that, when the landing gear 6 comes out, it causes the opening of the rear hatch 12, i.e. it gives rise to the vertical translation of the hatch 12 and then to its rotational motion combined with a horizontal translation so that the hatch 12 is parallel to the fairing 9.

Indeed, as can be seen in FIG. 7C, the hatch 12 is fixed to the landing gear 6 by a hinge system 20. The hinge system 20 has a goose-neck or mobile part 25b and a base or fixed part 25a. The fixed part 25a has a rigid link with the fairing 9 of the aircraft. The goose-necked feature 25b is linked at its ends to the part 25a and to the hatch 12 by rotating links 21. The hinge system 20 has a gradual locking system 22b for the closed position that can be seen in FIG. 8A. This linking element 26 is fixed to the landing gear 6 by a rigid link 24 and is connected to the hatch 12 by a rotating link 23. This linking element 26 has the role of a stop to stress the front hatches. Furthermore, it is the driving element that induces the motion of the rear hatch in the deployment of the landing gear.

Thus, the rear hatch 12 is fixed movably, firstly to the landing gear 6 and secondly to the fairing 9 of the aircraft. The positioning of the hatch 12 is therefore directly dependent on the position of the landing gear. When the gear is retracted, the hatch 12 is in a closed position. When the gear is extended, the hatch 12 is in a longitudinal position. As explained here above, in this longitudinal position, the rear hatch 12 is placed in parallel to the fuselage. This makes it possible to comply with the flow of the fluids in order to limit especially the wind factor and other aerodynamic disturbances. Furthermore, this longitudinal position reduces the projected surface area perpendicular to the flow of the fluid, thus reducing stresses on the hinges of the rear hatches.

Figure 8A:
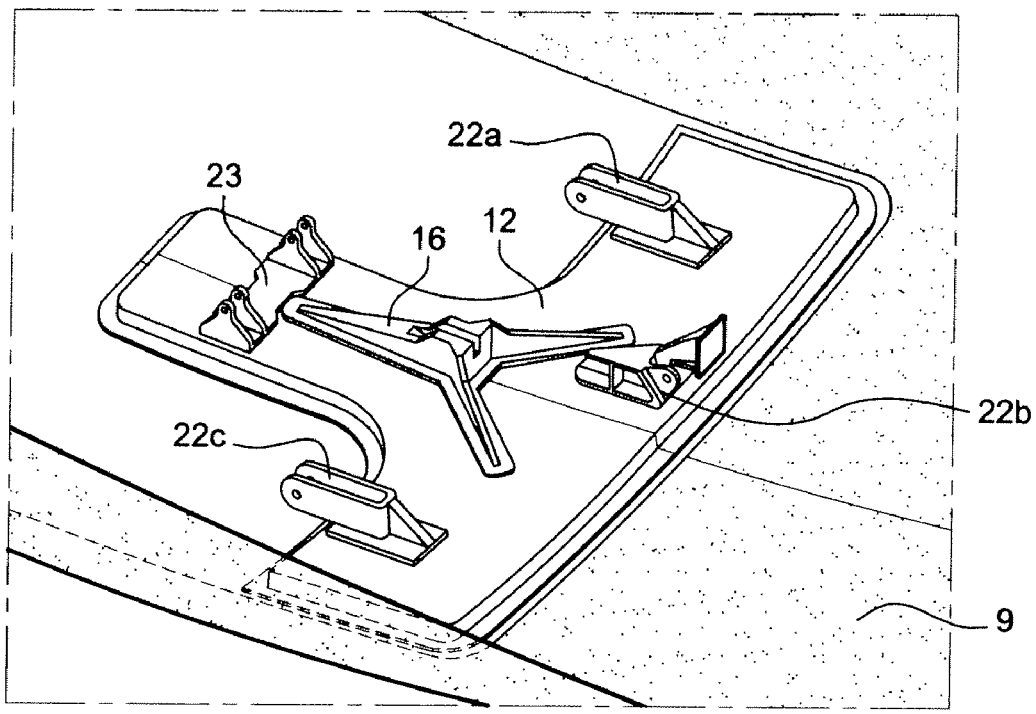
FIGS. 8A, 8B, 8C and 8D show different views of the hinge system of the secondary hatch according to the disclosed embodiments.
Figure 8B:
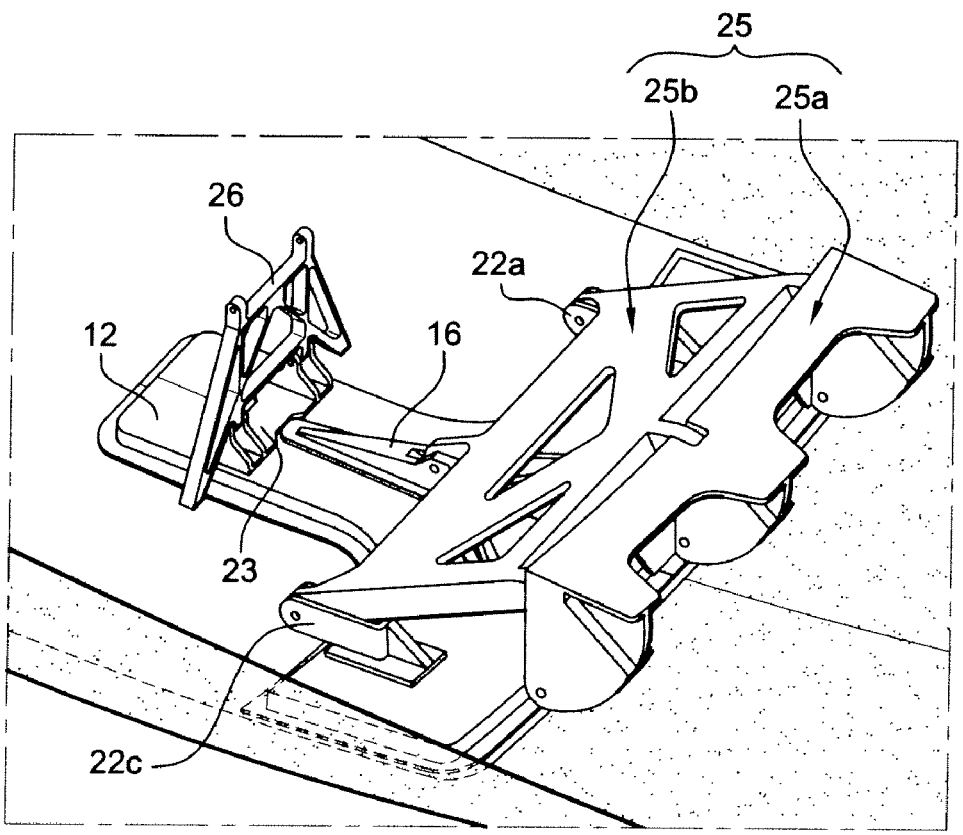
Figure 8C:
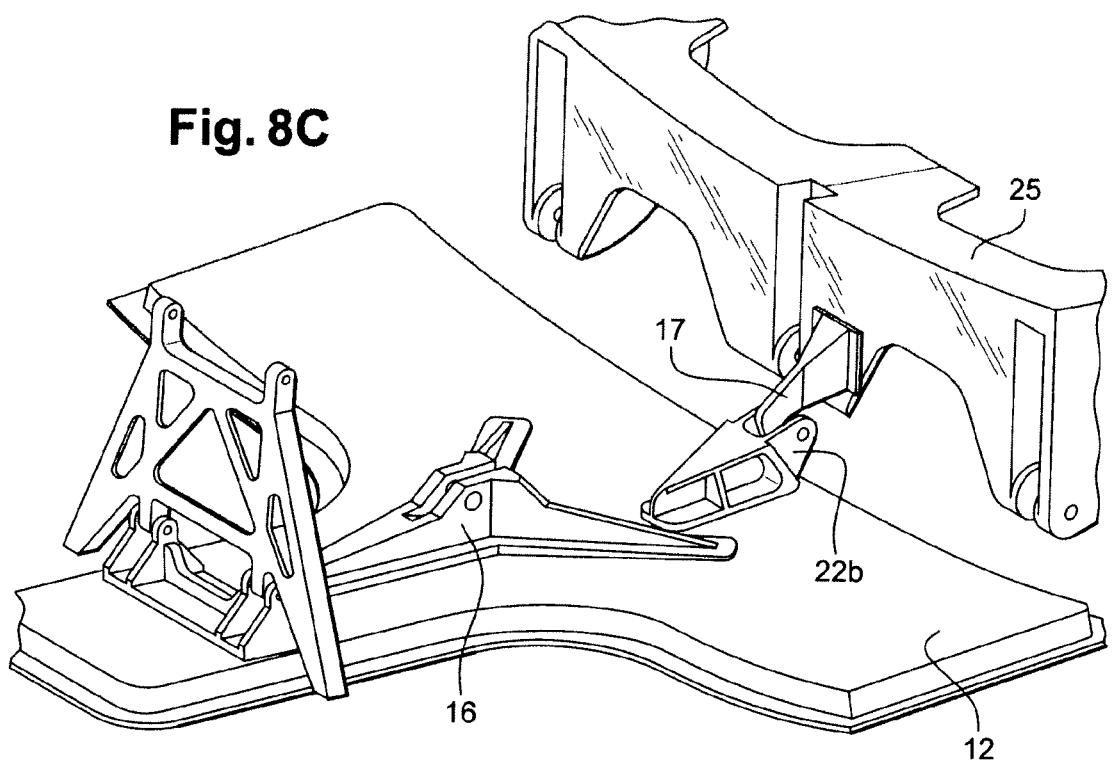

FIGS. 8A, 8B, 8C show the rear hatch in views from the interior of the aircraft, in different phases of installation of the hatch on the fairing of the aircraft.

In particular, FIG. 8A shows the rear hatch 12 when the goose-necked hinge has not yet been installed. This FIG. 8A shows the rear hatch 12 to be substantially T shaped with, at its centre, a stiffening piece 16. The role of this stiffening piece 16 is to stiffen the hatch 12 in order to rigidify the hatch and make it more resistant to vibrations, especially when the hatch is in an open position. Its role also is to prevent deformation of the hatch itself. Indeed, even if the hatch 12 is parallel to the floor of the fluids when it is open, the fluids exert forces on the surface of the hatch 12, giving rise to vibrations, especially when the aircraft is in a landing or takeoff phase. The stiffening piece 16 rigidities the hatch 12 in order to prevent any risk of breakage due to these vibrations.

FIG. 8A also shows the fastening point 23 of the linking element 26 on the hatch 12 and the fastening points 22a, 16 and 22c of the goose-necked hinge 25b on said hatch. In the example of FIG. 8A, the goose-necked feature 25b is mounted on the hatch 12 by means of ties distributed on the surface of the body of the T formed by the hatch. The ties may be simple ties such as the ties 22a and 22c, or else a tie combined with the stiffener 16, as can be seen in FIG. 8B, or a tie with gradual locking, such as the tie 22b which shall be described further below.

FIG. 8B shows the hatch 12 when the goose-necked hinge 25b and the linking element 26 are fixed to said hatch. The assembly 25 comprises a base 25a designed to be fixed to the fairing of the aircraft and a mobile part 25b mounted so as to be mobile relative to the base 25a and mobile relative to the ties 16, 22a, 22c. The assembly 25 thus makes it possible, by rotation of the mobile part 25b about the base 25a, to provide for the vertical translation of the hatch 12 and, by a double rotation of this mobile part about the ties 16, 22a, and 22c and about the base, to provide for the rotation motion combined with the horizontal translation of the hatch 12.

FIG. 8B also shows the mobile link 23 between the linking element 26 and the hatch 12. This linking element is fixed to the hatch 12 by means of a rotational fixing element 23 enabling the linking element 26 to achieve a rotational motion towards the rear (for the opening of the hatch) or towards the front (for the closing of the hatch) of the aircraft fuselage relative to the rear hatch 12. When the linking element 26 is in a vertical position, as in the case of FIG. 8b, it becomes a stop element used to place the front hatches in a prestressed condition. Consequently, the front hatches obtain their optimized and desired aerodynamic shape.

The ties 16, 22a, 22b, 22c shown in FIG. 8A are of two kinds. The simple ties 22a and 22c and the tie incorporated into the stiffener 16 are ties enabling simple rotation of the goose-necked feature 25b inside said ties. The tie 22b is a tie, preferably a central one, enabling a gradual kinematic locking of the hatch 12. It is understood that the number of simple ties and gradual locking ties can be modified especially as a function of the size of the rear hatch 12.

Figure 8D:
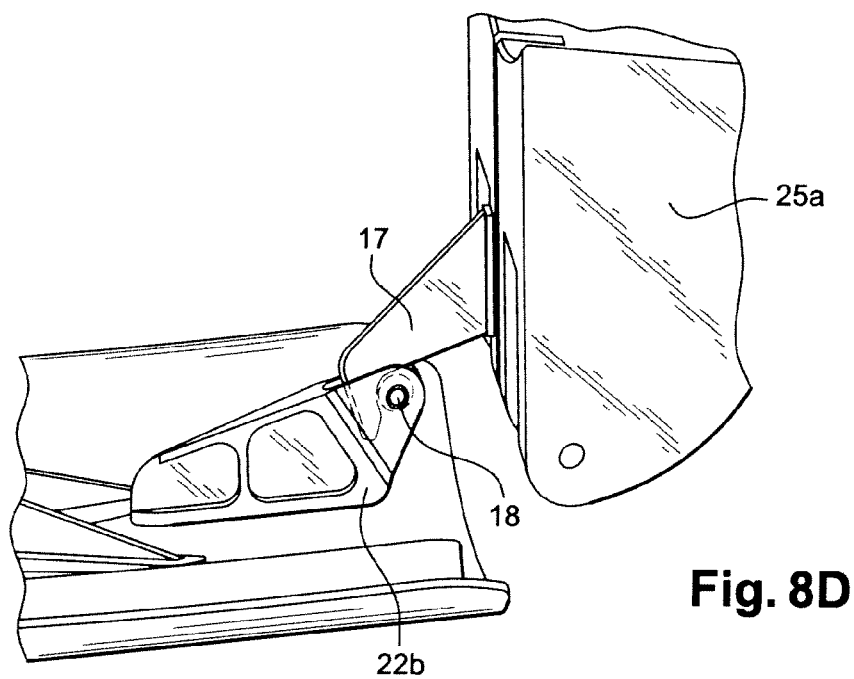

This tie 22b is shown in greater detail in FIGS. 8C and 8D. This tie 22b has a ball joint 18. A pawl 17, attached to the fixed part 25 surrounds and blocks this ball joint 18 so that, when the hatch 12 is closed, the goose-necked feature 25b is blocked and the tie 22b gets fixedly joined to the part 25a. This locking is a kinematic locking of the hatch 12 by a stressing of this hatch.

The tie 22b therefore constitutes a locking of the rear hatch when it is in a closed position. This locking is a gradual locking of the hatch due to the angle and the shape of the contact surface of the pawl 17, relative to the ball joint 18.

It will be understood from a reading of the above that, when the landing gear is in the deployment phase, the gear leg, by its rigid link 24, pushes the rear hatch outside the fuselage. The hinge system 20 of the rear hatch enables said hatch to perform a combined motion of translation and rotation towards the rear of the aircraft so that the rear hatch gets shifted beneath the fairing.

When the landing gear is in a retraction phase, the gear leg drives the rigid link 24, and this drives the rear hatch in a motion that is the reverse of the one described for the extension of the gear. When the rear hatch is in a closed position, the linking element 26 is perpendicular to the hatch by means of the rotating link 23. The hatch is locked to the rear by the system described here above and held forward by the rigid link 24. This system for opening and closing a gear compartment has been described solely for the rear hatch. It is understood that the system may comprise two rear hatches each corresponding to half of the rear hatch described, each half hatch being hinged separately and giving a result identical to the one described here above.

The system of the disclosed embodiments reduces aerodynamic disturbance. Furthermore, this secondary hatch is maneuvered solely in a mechanical way by the kinematics of the assembly. It may therefore be opened in a free fall procedure, i.e. using a safety procedure when the electronic or hydraulic system of the aircraft is malfunctioning and when, despite this malfunction, the landing gear has to be deployed to enable the landing of the aircraft.

The invention claimed is:

1. A system for opening and closing a landing-gear compartment of an aircraft comprising:
    a plurality of hatches mounted on a fairing of the aircraft, the plurality of hatches comprising main hatches with transversal opening and at least one secondary hatch with a longitudinal opening;
    said at least one secondary hatch has an outer surface that faces the outside of the aircraft and is flush with a fairing outer surface when in a closed position;
    a hinge system comprising:
        a mobile part;
        a fixed part, said fixed part has a rigid link with the fairing of the aircraft;
        said mobile part is linked to the fixed part and to the secondary hatch by rotating links;
        a linking element is fixed to a landing gear leg by a rigid link and is connected to the secondary hatch by a rotating link; and
    wherein said hinge system is configured to maintain the at least one secondary hatch parallel to the fairing outer surface during opening and in a fully open position.

2. The system according to claim 1, wherein in said closed position said secondary hatch is placed in the continuity of the fairing of the aircraft.

3. The system according to claim 1, wherein the secondary hatch is fixed to the fairing of the aircraft by means of the hinge system giving the secondary hatch a motion of vertical translation and a combined motion of rotation and horizontal translation.

4. The system according to claim 3, wherein the mobile part is comprised of a goose-necked hinge fixed by said rotating links, said rotating links are comprised of a first rotating link to the fairing and by a second rotating link to the secondary hatch.

5. The system according to claim 4, wherein the second rotating link comprises a plurality of ties distributed on the secondary hatch.

6. The system according to claim 5, wherein at least one of the ties provides for a rotation of the goose-necked feature and a gradual kinematic locking of the secondary hatch.

7. The system according to claim 3, wherein the linking element forms a stop for the closing of the main hatches.

8. The system according to claim 1, wherein the secondary hatch is equipped with a stiffening piece.

9. The system according to claim 8, wherein least one tie is incorporated into the stiffening piece.

10. The system according to claim 1, wherein the main hatches comprise two main hatches and the at least one secondary hatch comprises a single secondary hatch.

11. An aircraft comprising a system for opening and closing a landing-gear compartment according to claim 1.

* * * * *

UNITED STATES PATENT AND TRADEMARK OFFICE
CERTIFICATE OF CORRECTION

PATENT NO.         : 7,861,971 B2                                        Page 1 of 1
APPLICATION NO.    : 11/972244
DATED              : January 4, 2011
INVENTOR(S)        : Ponsart et al.

It is certified that error appears in the above-identified patent and that said Letters Patent is hereby corrected as shown below:

Column 8, line 57, Claim 9, before the word "least" insert -- at --, therefor.

Signed and Sealed this
Fifth Day of April, 2011

David J. Kappos
*Director of the United States Patent and Trademark Office*